(12) United States Patent
Volk

(10) Patent No.: US 12,206,347 B2
(45) Date of Patent: Jan. 21, 2025

(54) LINEAR MOTOR SYSTEM

(71) Applicant: Schneider Electric Industries SAS, Rueil-Malmaison (FR)

(72) Inventor: Reiner Volk, Helmstadt (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 1 day.

(21) Appl. No.: 17/959,616

(22) Filed: Oct. 4, 2022

(65) Prior Publication Data

US 2023/0115484 A1    Apr. 13, 2023

(30) Foreign Application Priority Data

Oct. 11, 2021   (EP) .................................... 21306425

(51) Int. Cl.
*H02P 25/064* (2016.01)
*B65G 23/23* (2006.01)

(52) U.S. Cl.
CPC ............ *H02P 25/064* (2016.02); *B65G 23/23* (2013.01)

(58) Field of Classification Search
CPC .............................. H02P 25/064; B65G 23/23
See application file for complete search history.

(56) References Cited

U.S. PATENT DOCUMENTS

| | | | | |
|---|---|---|---|---|
| 5,583,390 A | * | 12/1996 | Seki | .................. H02N 2/08 310/323.07 |
| 6,334,523 B1 | | 1/2002 | Fukunaga | |
| 2010/0276255 A1 | | 11/2010 | Staunton et al. | |
| 2010/0276256 A1 | | 11/2010 | Kleinikkink et al. | |
| 2013/0180824 A1 | | 7/2013 | Kleinikkink et al. | |
| 2016/0207717 A1 | | 7/2016 | Senn et al. | |

FOREIGN PATENT DOCUMENTS

| | | |
|---|---|---|
| DE | 10 2013 202 674 A1 | 8/2014 |
| WO | WO 2010/099610 A1 | 9/2010 |
| WO | WO 2015/036196 A2 | 3/2015 |
| WO | WO 2019/007198 A1 | 1/2019 |

OTHER PUBLICATIONS

Extended European Search Report issued Mar. 17, 2022 in European Patent Application No. 21306425.6, citing documents 1 and 15 through 18 therein, 10 pages.

\* cited by examiner

*Primary Examiner* — Zoheb S Imtiaz
(74) *Attorney, Agent, or Firm* — Oblon, McClelland, Maier & Neustadt, L.L.P.

(57) ABSTRACT

A linear motor system, in particular a transport system, for example a multi-carrier system, includes a guide track having a plurality of electromagnets arranged distributed along the guide track. The linear motor system furthermore includes a first and a second carrier that are guided by and movable along the guide track and that each include a drive magnet for cooperating with the electromagnets of the guide track to move the carriers; and a control device for controlling the movement of the carriers relative to the guide track by a corresponding control of the electromagnets. Furthermore, the linear motor system includes at least one energy transmission element that is fastened to the first and/or second carrier and that transmits energy from the first carrier to the second carrier.

18 Claims, 5 Drawing Sheets

LINEAR MOTOR SYSTEM

BACKGROUND

The present invention relates to a linear motor system, in particular a transport system, for example a multi-carrier system, comprising: a guide track having a plurality of electromagnets arranged distributed along the guide track; a first and a second carrier that are guided by and movable along the guide track and that each comprise a drive magnet for cooperating with the electromagnets of the guide track to move the carriers; and a control device for controlling the movement of the carriers relative to the guide track by a corresponding control of the electromagnets. The invention also relates to a method of operating such a system and to a carrier for such a system.

Linear motors are widely used today. They can, for example, be used to move, in particular to transport, products in industrial plants. Multi-carrier systems are particularly advantageous for the flexible transport of different products. They in particular comprise a plurality of carriers, i.e. transport units, that are movable individually and independently of one another. In a typical multi-carrier system, the guide track is closed in itself, i.e. practically endless, which enables a revolving operation.

In industrial systems, processing steps are often performed at the products, which are transported by the carriers, by external systems or persons at predefined positions along the guide track (i.e. at "stations"). For this purpose, a first carrier is typically decelerated when approaching the defined position, while a second carrier at which a processing step has already been performed is accelerated to move it away from the defined position. The energy required or the current required for braking the first carrier and for accelerating the second carrier results in a significant energy or current consumption and in high power requirements for the system. This in particular applies if the defined positions are to be approached with a high number of cycles, i.e. if a very large number of carriers have to be braked and/or accelerated per unit of time.

BRIEF SUMMARY

It is an object of the invention to optimize the efficiency of the linear motor system of the initially mentioned kind and/or to reduce the power requirements for the linear motor system.

This object is satisfied by a linear motor system in accordance with claim 1, and in particular in that at least one energy transmission element is fastened to the first and/or second carrier and is configured to transmit energy from the first carrier to the second carrier.

The invention relates to a linear motor system, in particular a transport system, for example a multi-carrier system, comprising:
a guide track having a plurality of electromagnets arranged distributed along the guide track;
a first and a second carrier that are guided by and movable along the guide track and that each comprise a drive magnet for cooperating with the electromagnets of the guide track to move the carriers;
a control device for controlling the movement of the carriers relative to the guide track by a corresponding control of the electromagnets; and
at least one energy transmission element that is fastened to the first and/or second carrier and that is configured to transmit energy from the first carrier to the second carrier.

The invention therefore uses the (kinetic) energy of the first carrier that moves along the guide track to accelerate the second carrier. The energy, and in particular the kinetic energy, of the first carrier is in this respect at least partly transmitted to the second carrier via the energy transmission element. If the first carrier being decelerated or to be decelerated falls below a predetermined minimum spacing from the second carrier being accelerated or to be accelerated, the energy transmission element can e.g. establish a temporary mechanical connection between the carriers, wherein energy of the first carrier is at least partly transmitted to the second carrier by the energy transmission element, i.e. the first carrier is decelerated and the second carrier is accelerated. For example, more than 20%, 30%, 50% or 70% of the energy, in particular kinetic energy, of the first carrier can be transmitted to the second carrier by the energy transmission element.

A direct and/or indirect transmission of the kinetic energy can in particular take place. In general, the first carrier has kinetic energy since the first carrier travels over the guide track at a certain speed while the second carrier is in a position of rest or moves along the guide track at a lower speed than the first carrier. As soon as the first carrier falls below a predetermined minimum spacing from the second carrier, an at least partial direct energy transmission of the kinetic energy from the first carrier to the second carrier and/or at an least partial storage of the kinetic energy of the first carrier by the energy transmission element in the form of potential energy (e.g. by tensioning an energy transmission element that is configured as a spring) and a subsequent conversion of the stored potential energy into kinetic energy in the form of an acceleration of the second carrier take place. The first carrier is in particular decelerated during the transmission of the energy.

The energy transmission element can generally be fastened to the first carrier and/or the second carrier, wherein the energy transmission element fastened to the respective carrier can always be directed in the direction of the interacting carrier and/or in the direction of travel of the carrier. It is generally also possible for a plurality of energy transmission elements to be fastened to the first and/or second carrier. This can lead to an amplification of the effect described so that the efficiency of the energy transmission is increased.

As a result of the energy transmission by the energy transmission element, a current required for braking the first carrier or for accelerating the second carrier can be reduced so that both the current consumption and the power requirements for the system are reduced.

Further developments of the invention can be found in the description, in the drawings and in the dependent claims.

In accordance with a first embodiment, the energy transmission element is configured to transmit the energy from the first carrier to the second carrier when the first and/or the second carrier enters/enter into an active region of the energy transmission element. The active region can define a region in which the energy transmission element stores and/or transmits energy. If the first carrier falls below the predetermined minimum spacing from the second carrier, this can define the entry into the active region. For example, the entry into the active region can mean that one of the two carriers comes into direct contact with the energy transmission element, i.e. directly contacts the energy transmission element. Over the period of time in which a carrier is in direct contact with the energy transmission element, the energy transmission element can at least partly store and/or transmit the energy, and in particular the kinetic energy, of the first carrier to the second carrier. From the point in time at which the respective carrier and the energy transmission element are no longer in contact, the energy of the first carrier and/or the energy stored in the energy transmission element can have been completely or at least partly transmitted to the second carrier so that no or virtually no energy is stored in the energy transmission element. Alternatively, the energy transmission can also take place without a direct contact of a carrier with the energy transmission element. For this purpose, the energy transmission element can, for example, be configured so that when the first carrier enters the active region of the energy transmission element of the first and/or second carrier, the carriers repel one another and the first carrier is thus decelerated while the second carrier is being accelerated. In this respect, the energy transmission element can, for example, be configured as a magnet, wherein the two energy transmission elements of the first and second carriers preferably repel one another in the active region.

The linear motor system preferably comprises an information feedback device for feeding at least one piece of feedback information back to the control device that relates to the movement of the carrier and/or the activity of the electromagnets during a movement of the carrier, wherein the control device is configured to regulate the movement of the carrier, in particular on the basis of the feedback information. Feedback information can, for example, be information about the position, speed, acceleration, energy of a carrier, the current used for moving the carrier, or any other information about the movement of the carrier or carriers. The feedback information is typically acquired via sensors, by calculations, or in another manner. In general, for the regulation of the movement of the carrier, an actual value of, for example, the acceleration of the carrier is iteratively compared with a predefined desired value and the deviation between the actual value and the desired value is minimized by the regulation.

In accordance with a further embodiment, the acceleration of the second carrier attributable to the control device is at least not negative in the active region and/or deviates by at most 15% or 10% from the acceleration attributable to the energy transmission element, wherein a negative acceleration, for example, corresponds to a braking. In other words, the acceleration acting on the second carrier by the control device and in particular by the control of the electromagnets (i.e. the acceleration that would occur if only the acceleration caused by the electromagnets and controlled by the control device 17 were considered) at least has no decelerating effect and/or deviates by at most 15% or 10% from the acceleration that acts on the second carrier by the energy transmission element (i.e. that would occur if only the spring were considered in the acceleration).

The movement control of the second carrier by the control device thus has a supporting effect on the acceleration curve of the second carrier caused by the energy transmission element. It is preferred that the control of the movement of the second carrier performed by the control device does not operate in opposition to or with a strong deviation from the acceleration curve caused by the energy transmission element, i.e. does not weaken the acceleration attributable to the energy transmission element. No (unintended) braking by the control circuits of the control device therefore takes place. If the control device, for example, determines through the position information of the first and second carriers that the predetermined minimum spacing between the first carrier and the second carrier is fallen below and that the first and/or the second carrier has/have thus entered the active region, the control device does not accelerate the second carrier, at least as long as it is in the active region. The control device in particular compares a desired acceleration value of the second carrier with an actual acceleration value of the second carrier and adapts the latter by a corresponding control of the electromagnets such that a difference between the desired value and the actual value is minimized.

In accordance with a further embodiment, the control device is configured to adapt the control of the movement of the second carrier to an acceleration curve of the second carrier caused by the energy transmission element. As described above, the control of the movement of the second carrier can be adapted such that it deviates by no more than 15% or 10% from the acceleration attributable to the energy transmission element. The acceleration curve attributable to the control device preferably corresponds to the acceleration curve attributable to the energy transmission element or at least approximates the acceleration curve attributable to the energy transmission element. In other words, the control device acts such that the efficiency of the energy transmission by the energy transmission element is increased or is at least not lowered. The control of the movement of the second carrier performed by the control device thus assists and/or amplifies the acceleration of the second carrier caused by the energy transmission element.

For example, the acceleration curve attributable to the energy transmission element can be determined or calculated in advance so that an adaptation of the control to the acceleration curve attributable to the energy transmission element can be made. The acceleration curve attributable to the energy transmission element in particular depends on the properties of the energy transmission element. Depending on the properties of the energy transmission element, the control of the movement of the second carrier can therefore also be adapted. The control of the movement of the first, decelerating carrier is in particular also adaptable to the braking curve of the first carrier attributable to the energy transmission element. The corresponding statements above and below relating to the cooperation between the control and the acceleration of the second carrier attributable to the energy transmission element apply in the same way to the cooperation of the control with the braking of the first carrier attributable to the energy transmission element.

The acceleration curve of the second carrier attributable to the energy transmission element in particular has an approximately sinusoidal course, i.e. as soon as the first and/or the second carrier enters/enter the active region, the acceleration of the second carrier, due to the energy transmission, increases sharply up to a maximum acceleration value (peak) and decreases after reaching the maximum acceleration value. The second carrier in particular reaches the maximum acceleration value when the spring deflection is at a maximum.

In accordance with a further embodiment, the control device is configured to set the control of the movement of the second carrier such that an approximately triangular or trapezoidal acceleration curve is achieved (i.e. controlled) by the control. The jerk, i.e. the instantaneous time rate of change of the acceleration, of the second carrier is in particular constant. To map the sinusoidal acceleration curve attributable to the energy transmission element as accurately as possible with the aid of the control, the control device is configured to control the movement of the second carrier by means of an approximately triangular or trapezoidal acceleration curve. In general, the acceleration curve of the second carrier attributable to the control device can adopt any desired shape and preferably a shape that approximates the acceleration curve attributable to the energy transmission element. It is in particular also conceivable that the jerk of the second carrier is not constant, wherein the acceleration curve attributable to the control and the acceleration curve of the second carrier attributable to the energy transmission element can also be almost identical in such a case.

In accordance with a further embodiment, an optimal start spacing $d_{opt}$ between the second carrier and the first carrier is determined by means of an iteration method, wherein the iteration method comprises:

(1) a first start spacing $d_1$ between the first carrier and the second carrier being defined, at which first start spacing $d_1$ a first minimum distance $d_{min,1}$ between the carriers results that is smaller than an optimal minimum distance $d_{min,opt}$, wherein the start spacing defines a distance between the first carrier and the second carrier, with the first carrier starting to brake and the second carrier starting to accelerate on a falling below of said distance;

(2) a second start spacing $d_2$ between the first carrier and the second carrier being defined, at which second start spacing $d_2$ a second minimum distance $d_{min,2}$ results that is greater than an optimal minimum distance $d_{min,opt}$;

(3) a third start spacing $$d_3 = \frac{d1 + d2}{2}$$

being calculated and a corresponding third minimum distance $d_{min,3}$ being determined;

(4) $d_1$ and $d_2$ being updated as follows:
$d_1 := d$ and
$d_2 := d_3$ if $(d_{min,1} - d_{min,opt}) \cdot (d_{min,3} d_{min,opt}) < 0$; or
$d_1 := d_3$ and
$d_2 := d_2$ if $(d_{min,2} - d_{min,opt}) \cdot (d_{min,3} - d_{min,opt}) < 0$.

(5) steps (3) and (4) being repeated if $d_{min,2} - d_{min,opt} >$ epsilon and $d_3$ is not equal to 0;

(6) the optimal start spacing $d_{opt}$ resulting as follows:
$d_{opt} = d_2$ or
$d_{opt} = d_3$ if $d_{min,3} \; d_{min,opt} = 0$.

The optimal start spacing $d_{opt}$ in particular corresponds to a spacing between the first carrier and the second carrier that is equal to the size of the active region. If, for example, the first carrier falls below a defined distance from the second carrier (e.g. enters the active region), the second carrier starts to accelerate or the second carrier is accelerated by the control of the electromagnets by the control device. Furthermore, the minimum distance between two carriers is defined as the minimum distance between two carriers during a braking and acceleration process of the first and second carriers or while the two carriers are located in the active region. Accordingly, the minimum distance $d_{min,1}$ is defined as the minimum distance for a braking and acceleration process of the first and second carriers with a start spacing of $d_1$. The minimum distances $d_{min,2}$, $d_{min,3}$ and $d_{min,opt}$ are also to be understood accordingly. The minimum distance between the first carrier and the second carrier, which, when fallen short of, can lead to an inefficient energy transmission and/or a collision and thereby to a mechanical shock and thus to damage to the first and/or second carrier and/or to the energy transmission element, is preferably greater than or ideally equal to the minimum distance of the two carriers at a maximum spring deflection (in the case of an energy transmission element configured as a spring) or at the smallest extent of the energy transmission element. For example, the minimum distance at a maximum spring deflection can be predefined, determined, or calculated.

By means of the iteration method, the first start spacing $d_1$ between the first carrier and the second carrier is defined, at which first start spacing $d_1$ the first minimum distance $d_{min,1}$ between the carriers (at a maximum spring deflection) results that is smaller than the optimal minimum distance $d_{min,opt}$ (at a maximum spring deflection), wherein $d_{min,opt}$ represents the minimum distance between two carriers at which a maximum energy exchange between the carriers is realized. The first start spacing $d_1$ can, for example, be determined by means of empirical data, by experiments, or based on calculations. The start spacing $d_1$ can in particular be determined by means of a simulated and/or real execution of braking and acceleration processes of the first and second carriers. For example, in a simulated execution, the corresponding parameters, in particular $d_1$, can be set in advance and the resulting value for $d_{min,1}$ can be read out. In a real execution, the control can be adapted accordingly so that the first carrier starts to brake or the second carrier starts to accelerate as soon as a falling below of a distance $d_1$ between the first carrier and the second carrier is, for example, detected via position sensors or by means of calculations. The resulting minimum spacing can likewise be determined by means of position sensors. The simulated and/or real braking and acceleration processes can be carried out until a first start spacing $d_1$ is determined that satisfies the above-mentioned condition. The optimal minimum distance $d_{min,opt}$ (at a maximum spring deflection) can be known in advance, determined, or calculated. For example, the optimal minimum distance can be predefined or determined based on the properties and characteristic values of the energy transmission element.

Corresponding to the determination of the first start spacing $d_1$, the second start spacing $d_2$ can also be determined using the methods described, wherein the second minimum distance $d_{min,2}$ (at a maximum spring deflection) is greater than an optimal minimum distance $d_{min,opt}$ (at a maximum spring deflection).

It is ensured by this selection of $d_1$ and $d_2$ that $d_{opt}$ lies in the interval $[d_1, d_2]$. $d_{opt}$ lies in the interval $[d_1, d_2]$ exactly when the differences $(d_{min,1} - d_{min,opt})$ and $(d_{min,2} - d_{min,opt})$ have a sign change or when the condition $(d_{min,1} - d_{min,opt}) \cdot (d_{min,2} - d_{min,opt}) < 0$ is satisfied. An interval nesting method is used for determining the optimal start spacing $d_{opt}$. For this purpose, the interval $[d_1, d_2]$ in which $d_{opt}$ is located is halved. The resulting two intervals result as $[d_1, d_3]$ and $[d_3, d_2]$, where $$d_3 = \frac{d1 + d2}{2}.$$

To check in which of the resulting intervals $d_{opt}$ lies, $d_{min,3}$ is, for example, determined by means of a simulated and/or real execution of braking and acceleration processes of the two carriers in that at least one braking and acceleration process of the two carriers is performed with the start spacing $d_3$. Alternatively, $d_{min,3}$ can, for example, be read off from a table based on empirical data. Depending on the interval for which there is a sign change of the differences $d_{min,1}-d_{min,opt}$ and $d_{min,3}-d_{min,opt}$ (case 1) or $d_{min,3}-d_{min,opt}$ and $d_{min,2}-d_{min,opt}$ (case 2), it is determined in which interval $d_{opt}$ lies. If the condition $d_{min,1}-d_{min,opt} \cdot d_{min,3}-d_{min,opt} < 0$ (case 1) is satisfied, $d_{opt}$ lies in the interval $[d_1, d_3]$, while if the condition $(d_{min,2}-d_{min,opt}) \cdot (d_{min,3}-d_{min,opt}) < 0$ (case 2) is satisfied, $d_{opt}$ lies in the interval $[d_3, d_2]$. Consequently, the new interval in which $d_{opt}$ is searched is updated so that the following update results for the interval boundaries $d_1$ and $d_2$:

For case 1: $d_1:=d_1$ and $d_2:=d_3$ and
For case 2: $d_1:=d_3$ and $d_2:=d_2$.

Subsequently, the interval nesting is repeated until a start spacing $d_2$ is determined for which the condition $\Delta d_{min}=d_{min,2}-d_{min,opt}<$epsilon is satisfied, wherein epsilon is a predetermined value, for example 2 cm, 1 cm, or 0.5 cm. The optimal start spacing is then given by $d_{opt}=d_2$. Alternatively, the start spacing $d_1$ for which the condition $\Delta d_{min}=d_{min,1}-d_{min,opt}<$epsilon is satisfied can also be used as the optimal start spacing $d_{opt}=d_1$. A special case results when $d_{min,3}=d_{min,opt}$. In such a case, the iteration method can be aborted since the exact optimal start spacing is $d_{opt}=d_3$ in this scenario.

In accordance with a further embodiment, the energy transmission element comprises a spring. The spring in particular stores at least some of the kinetic energy of the first carrier in the compressed state as potential energy $E_{pot}$ and converts the stored potential energy $E_{pot}$ into kinetic energy on the transmission to the second carrier by a stretching. Assuming that the two carriers have an equal mass and while neglecting the friction, the potential energy $E_{pot}$ stored in the spring at a maximum spring deflection can be determined as follows:

Equation (1) illustrates the kinetic energy of the first carrier $E_{kin,start}$ just before or at the start of the energy transmission:

$$E_{kin,start} = \frac{m}{2} \cdot v_{start}^2,$$

where $v_{start}$ is the speed of the first carrier just before or at the start of the energy transmission when the spring deflection is equal to zero, and $E_{kin,start}$ represents the kinetic energy of the first carrier.

In the event that the negative acceleration of the carrier to be braked has the same magnitude as the positive acceleration of the carrier to be accelerated and the braking and acceleration process starts exactly at the moment when the distance between the first and the second carrier corresponds to the active region of the spring (optimal condition), the kinetic energy associated with the first carrier and second carrier can be calculated at the point in time of the maximum spring deflection as follows:

$$v_{L1} = v_{L2} = \frac{v_{start}}{2}$$

$$m = m_{L1} = m_{L2}$$

$$E_{kin,total} = E_{kin,L1} + E_{kin,L2} = \frac{m}{2} \cdot \frac{V_{start}^2}{2} + \frac{m}{2} \cdot \frac{V_{start}^2}{2} = \frac{m}{4} \cdot v_{start}^2,$$

where $v_{L1}$ or $v_{L2}$ represents the speed of the first carrier or the second carrier, $m_{L1}$ or $m_{L2}$ represents the mass of the first carrier or the second carrier and $E_{kin,total}$ represents the total kinetic energy of the carriers including the kinetic energy of the first carrier $E_{kin,L1}$ and the kinetic energy of the second carrier $E_{kin,L2}$ at the point in time of the maximum spring deflection. When looking at the equations (1) and (2), it becomes clear that $E_{kin,total}$ is half the size of $E_{kin,start}$, i.e. the kinetic energy of the two carriers at the moment of the maximum spring deflection is half the kinetic energy $E_{kin,start}$ at the start of the energy transmission when the spring deflection is equal to zero.

The potential energy stored in the spring thus corresponds to the energy difference:

$$E_{pot,spring} = E_{kin,start} - E_{kin,total} = \frac{m}{4} \cdot v_{start}^2.$$

In accordance with an embodiment, the spring constant of the spring that can at least store this energy difference can be described by the following equation:

$$D_{spring} = \frac{2E_{pot,spring}}{s_{deflection}^2},$$

where $D_{spring}$ represents the spring constant of the spring and $E_{pot,spring}$ represents the potential energy stored in the spring at a maximum spring deflection.

In this respect, $E_{pot,spring}$ can be determined as follows:

$$E_{pot,spring} = \frac{m}{4} v_{start}^2,$$

where m is the mass of a carrier and $v_{start}$ is the speed of the first carrier when contacting the spring (i.e. when entering the active region). The spring constant of the spring can correspond to the value calculated in accordance with the above equation or deviate from it by at most 15%, preferably 10%, particularly preferably 5%. For the speed $v_{start}$ of the carrier, a typical speed during the normal operation of the linear motor system or a maximum speed (which can at most be reached by carriers of the linear motor system) can be applied. In such a design of the spring constant of the spring, the efficiency of the energy transmission between the carriers can be increased.

$s_{deflection}$ can represent the length of the deflection distance of the spring at a maximum deflection, wherein the length of the deflection distance $s_{deflection}$ is determined by the length of the braking distance of the first carrier and of the acceleration distance of the second carrier:

$$v = v_{L1} = v_{L2} = \frac{v_{start}}{2}$$

$$s_{L1} = \frac{V_{start}^2}{2 \cdot a} - \frac{v^2}{2 \cdot a} = \frac{4 \cdot v^2 - v^2}{2 \cdot a} = 3 \cdot \frac{v^2}{2 \cdot a}$$

$$s_{L2} = \frac{v^2}{2 \cdot a}$$

$$s_{deflection} = s_{L1} - s_{L2} = 3 \cdot \frac{v^2}{2 \cdot a} - \frac{v^2}{2 \cdot a} = 2 \cdot \frac{v^2}{2 \cdot a} = \frac{V_{start}^2}{4 \cdot a},$$

where $s_{L1}$ is the traveled braking distance of the first carrier, $s_{L2}$ is the traveled acceleration distance of the second carrier, and $\alpha$ is the magnitude of the acceleration of the first and/or second carrier. Consequently, the spring deflection is equal to the difference between the traveled braking distance of the first carrier and the traveled acceleration distance of the second carrier.

In accordance with an embodiment, the deflection distance of the spring at a maximum spring deflection can correspond to the result in accordance with the above formula or deviate from it by at most 15%, preferably 10%, particularly preferably 5%. If the maximum deflection distance is calculated and set in accordance with the above formula, an optimized energy transmission can be achieved.

In addition to a spring, the energy transmission element can also be any other suitable energy-transmitting element. For example, the energy transmission element can be or comprise a pneumatic cylinder, a hydraulic cylinder, a magnet, or a plastic compound/polymer compound.

For example, magnets of the same polarity can be fastened to the first and second carriers at a side facing the first or second carrier. If the first carrier moves towards the second carrier and falls below a predetermined distance from the second carrier, the first carrier can be decelerated and the second carrier can be accelerated by the repulsive effect of the two magnets having the same polarity.

In accordance with a further embodiment, the energy transmission element can at least regionally be recessed in the carrier to which the energy transmission element is fastened. For example, the first and/or second carrier comprises/comprise openings that extend at least regionally through the carrier in the direction of travel and that serve to receive and/or to fasten the energy transmission element. If, for example, the energy transmission element comprises a spring, the spring can be completely or at least regionally recessed in the opening (e.g. a borehole) at a maximum contraction of the spring. The openings can in particular be openings already present at a standard carrier so that a standard carrier can be equipped or retrofitted with an energy transmission element.

Additionally or alternatively, the spring can enclose, surround, or comprise a support element and in particular a plunger that extends in an axial direction through the spring, wherein the support element can preferably be pressed into the opening of the first and/or second carrier on a contact of the spring with the first and/or second carrier so that the plunger can at least partly be recessed in the opening. Due to the plunger, an increased stability of the spring fastened to the respective carrier can be provided compared to a spring without a plunger.

In accordance with a further embodiment, the sum of the length of a braking distance of the first carrier and an acceleration distance of the second carrier is at least greater than or equal to the sum of the width of the first and the second carrier in the direction of travel. If this condition is not met, a collision can occur. If the energy transmission element, and in particular the spring, can be completely recessed in the carrier, the first and second carriers can contact one another at the moment of the maximum spring deflection, i.e. when the addition of the braking distance of the first carrier and the acceleration distance of the second carrier is equal to the addition of the width of the first and second carriers.

In accordance with a further embodiment, the energy transmission element is attached along a center of mass line that extends in the direction of travel through a center of mass of the first and/or second carrier. If the linear motor system has a plurality of energy transmission elements fastened to the first and/or second carrier, the energy transmission elements can be arranged axially symmetrically to the center of mass line of the respective carrier. The fastening of the energy transmission element along a center of mass line or axially symmetrical to the center of mass line has the result that, on a transmission of the energy from the first carrier to the second carrier, the energy is transmitted uniformly to the second carrier so that an unwanted displacement or a decoupling of the carrier from the linear motor system is prevented.

A further aspect of the invention relates to a method of operating a linear motor system, in particular a transport system, e.g. a multi-carrier system, and in particular a linear motor system in accordance with any one of the preceding embodiments, wherein the linear motor system comprises:
  a guide track having a plurality of electromagnets arranged distributed along the guide track;
  a first and a second carrier that are guided by and movable along the guide track and that each comprise a drive magnet for cooperating with the electromagnets of the guide track to move the carriers; and
  a control device for controlling the movement of the carriers relative to the guide track by a corresponding control of the electromagnets,
  wherein the method comprises
  energy of the first carrier being at least partly transmitted to the second carrier by an energy transmission element fastened to the first and/or second carrier.

In accordance with an embodiment, the first carrier is decelerated on the transmission of the energy to the second carrier and the second carrier is accelerated on the transmission of the energy. For example, on the entry of the first and/or second carrier into the active region, the first carrier is decelerated by the control device and by the energy transmission via the energy transmission element to the second carrier, while the second carrier is accelerated by the control device and by the energy transmission via the energy transmission element. In this respect, the braking curve of the first carrier and the acceleration curve of the second carrier in particular depend on the control and the properties of the energy transmission element. The braking curve of the first carrier and the acceleration curve of the second carrier in particular depend on the matching of the braking curve or acceleration curve attributable to the control device and the braking curve or acceleration curve attributable to the energy transmission element.

In accordance with an embodiment, a braking of the first carrier and an acceleration of the second carrier start when both carriers are located in the active region of the energy transmission element, and the braking of the first carrier and the acceleration of the second carrier end when both carriers have left the active region of the energy transmission element. If the energy transmission element comprises a spring (as explained above), the braking of the first carrier or the acceleration of the second carrier, for example, starts when the spring and the respective carrier come into contact and the braking of the first carrier or the acceleration of the second carrier ends when the spring and the respective carrier are no longer in contact so that the carrier then continues to travel along the guide track at a constant speed. For example, the position of the first and second carriers and thus the distance between the first carrier and the second carrier can be detected via position sensors so that the entry into the active region is detected as soon as a predetermined distance between the first carrier and the second carrier is fallen below. Subsequent to the detection of the entry of the first carrier into the active region, the control can control the braking of the first carrier and the acceleration of the second carrier as described above by means of a control function, which was determined in advance and is adapted to the acceleration curve attributable to the energy transmission element, so that the greatest possible efficiency is ensured during the energy transmission.

A further aspect of the invention relates to a carrier for a linear motor system in accordance with any of the preceding embodiments, wherein the carrier comprises a drive magnet for cooperating with electromagnets of a guide track of the linear motor system to move the carriers; and at least one energy transmission element for transmitting kinetic energy. The carrier preferably comprises at least one opening for receiving, in particular temporarily receiving, the energy transmission element, said opening least regionally extending through the carrier along a direction of travel of the carrier and fixing the energy transmission element in the carrier. It is generally also possible for the carrier to comprise a plurality of energy transmission elements and openings. The energy transmission elements can in particular be attached to the carrier in the direction of travel and/or against the direction of travel.

The statements regarding the linear motor system in accordance with the invention apply accordingly to the method and the carrier; this in particular applies with respect to advantages and embodiments.

BRIEF DESCRIPTION OF THE DRAWINGS

The invention will be presented purely by way of example with reference to the drawings in the following. There are shown.

DETAILED DESCRIPTION

Figure 1:
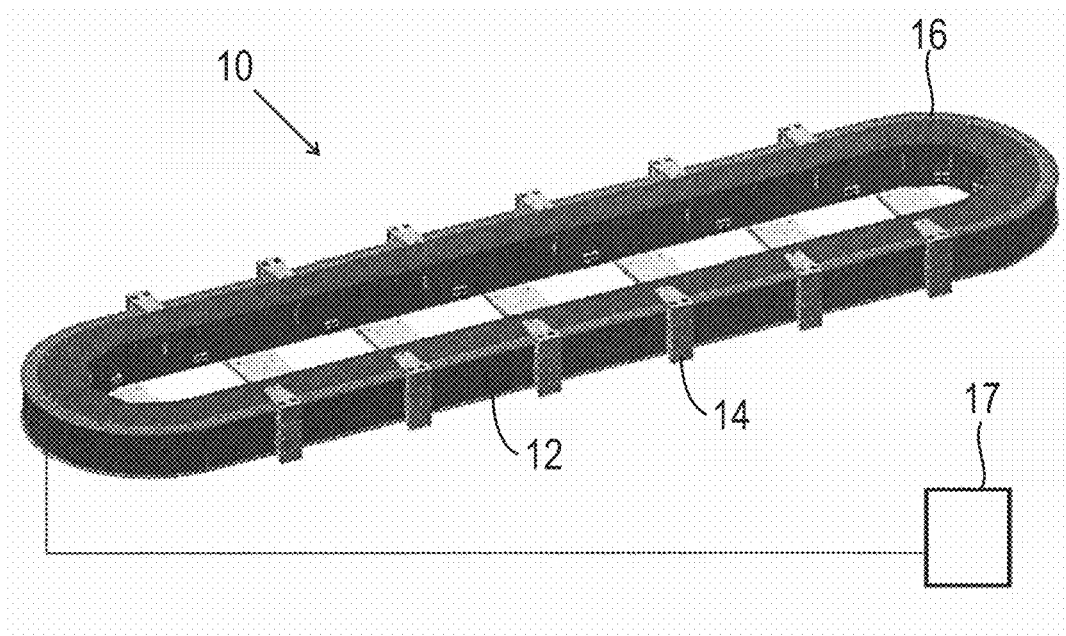
FIG. 1 a linear motor system configured as a transport system.

A linear motor system 10, which is configured as a multi-carrier system, is shown in FIG. 1. The linear motor system 10 comprises a plurality of linear motors 12 that are arranged in a row so that a continuous and in this case revolving movement of the carriers 14 along a guide track 16 is made possible. The transport system 10 comprises a plurality of carriers 14 that form individual transport elements of the transport system 10 and that can be moved independently of one another along the guide track 16 by means of the linear motors 12. A control device 17 in this respect controls the movement of the carriers 14 along the guide track 16.

Figure 2A:
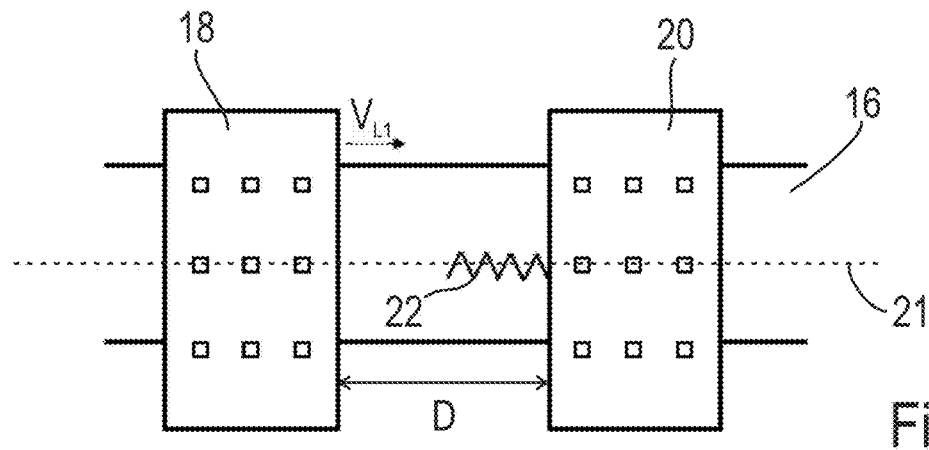
FIGS. 2A to 2D the transmission of energy from a first carrier to a second carrier.

FIG. 2A shows a front view of a section of the linear motor system 10. A first carrier 18 is visible that is guided on the guide track 16 at a speed $v_{L1}$ and that moves towards a second carrier 20. An energy transmission element in the form of a spring 22, which faces in the direction of the first carrier 8, is fastened to the second carrier 20 along a center of mass line 21 that extends through the center of mass in the direction of travel. Between the first carrier 18 and the second carrier 20, there is a distance D that can, for example, be determined by means of sensors, not shown.

Figure 2B:
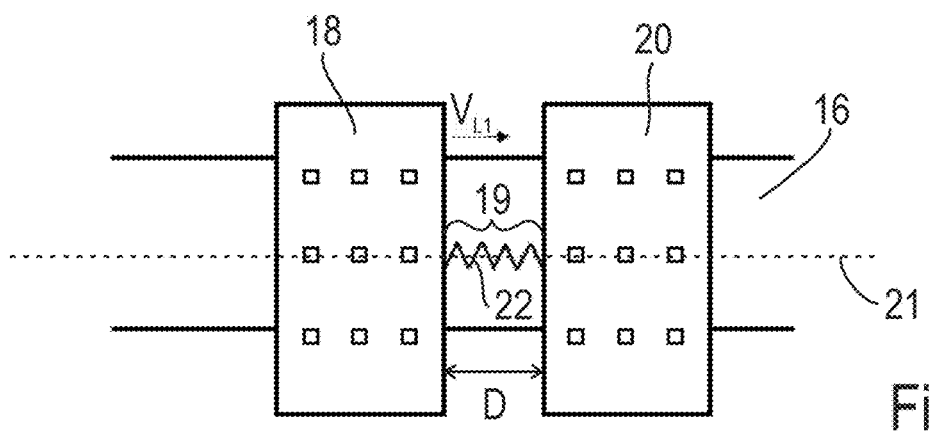

As soon as a predetermined distance between the two carriers 18, 20 is fallen below by the first carrier and the first carrier 18 thus enters into an active region 19 of the spring 22 or comes into direct contact with the spring 22, as shown in FIG. 2B, the control device 17 starts to decelerate the movement of the first carrier 18 and simultaneously to accelerate the movement of the second carrier 20. In this respect, the control of the movement of the first carrier 18 and/or the movement of the second carrier 20 is adapted to an acceleration curve that was, for example, previously determined via an iteration method and that can be attributed to the spring 22 independently of the control device 17.

Figure 2C:
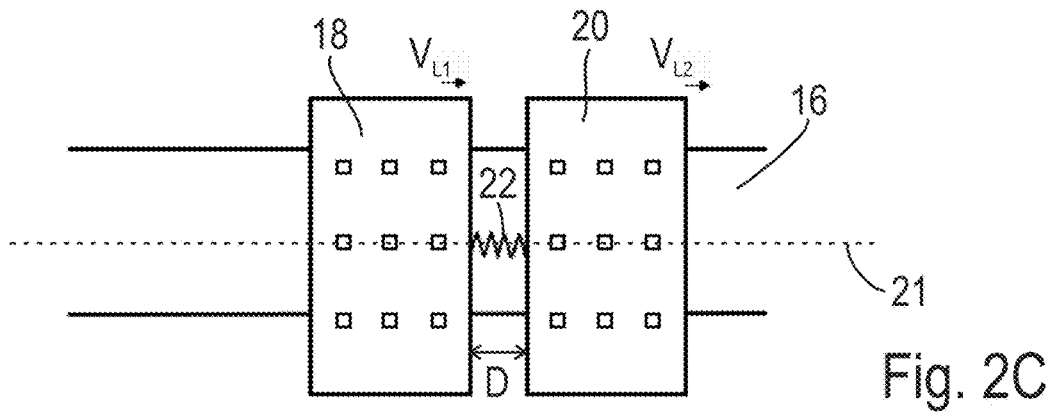

Due to the spring 22, at least some of the kinetic energy of the first carrier 18 is transmitted directly to the second carrier 20 and/or stored in the spring 22 as potential energy and is subsequently transmitted as kinetic energy to the second carrier 20. Thus, the first carrier 18 is decelerated and the second carrier 20 is accelerated by the energy transmission. This effect is enhanced by controlling the movement of the first and second carriers 18, 20 by means of the control device 17. The spring 22 is compressed up to a point of the maximum spring deflection, as shown in FIG. 2C, so that the two carriers 18, 20 have a minimum distance from one another in a maximum compressed state of the springs 22. At the moment of the maximum spring deflection, energy is stored in the spring 22 that corresponds to half the kinetic energy of the first carrier 18 shortly before or exactly on the entry into the active region 19. As soon as the state of the maximum spring deflection is reached, the spring 22 at least partly transmits the potential energy stored in the spring 22 in the form of kinetic energy to the first and/or second carrier 18, 20 so that the second carrier 20 is accelerated and the first carrier 18 is decelerated.

Figure 2D:
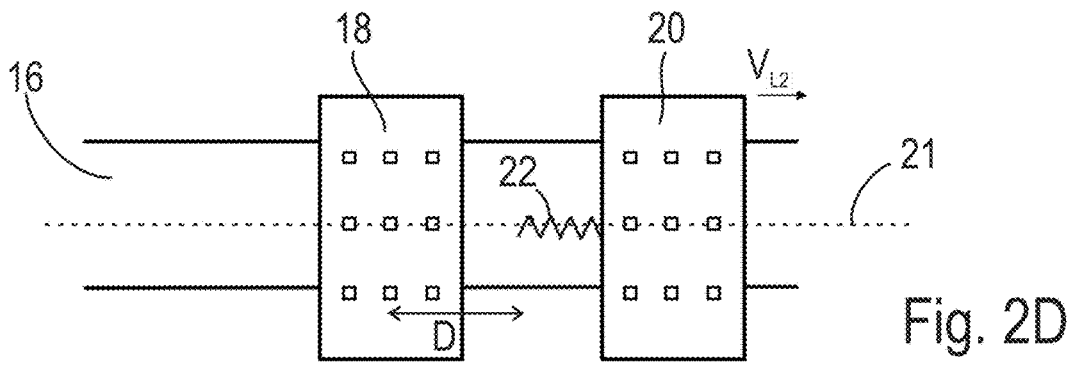

As can be seen in FIG. 2D, after the transmission of the energy, the second carrier 20 is guided on the guide track 16 at a constant speed v, while the first carrier 18 continues to be decelerated or is at rest.

The control device 17 is in particular configured to determine the acceleration curve or braking curve of the second or first carrier 18, 20 attributable to the spring 22 and to adapt a control of the movement of the first and second carriers 18, 20 to that effect.

Figure 3:
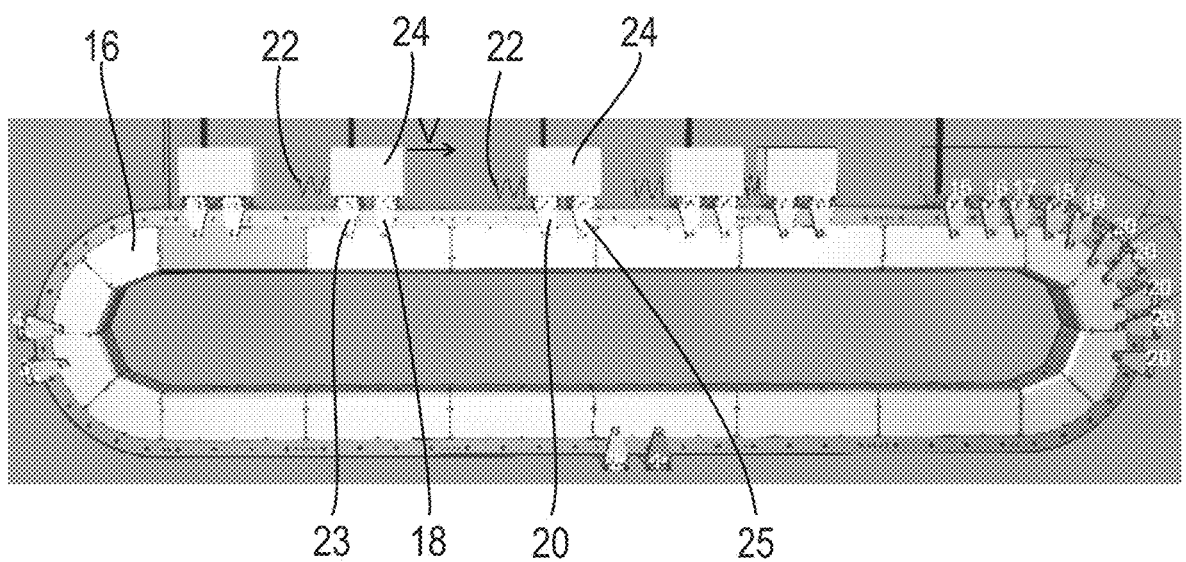
FIG. 3 a plan view of the linear motor system.

FIG. 3 shows a plan view of the linear motor system 10 in which loads 24 are transported by a respective two carriers 14. The first carrier 18 transports a load 24 together with a third carrier 23, while the second carrier 20, to which a spring 22 is fastened, transports a further load 24 together with a fourth carrier 25. In this respect, the carriers 14 transporting a common load are connected only by the load 24 that is fastened to the two carriers. Alternatively, two carriers 14 that jointly transport a load 24 may, for example, be connected via a connection element so that the two carriers 14 are connected to one another. For example, the two carriers 14 can be connected so that the two carriers 14 have a fixed spacing from one another. The first and third carriers 18, 23 move toward the second and fourth carriers 20, 25 at the speed v, wherein the first and third carriers 18, 23, when contacting the first carrier 18 and the spring 22 fastened to the second carrier 20, at least partly transmit energy, and in particular kinetic energy, to the second and fourth carriers 20, 25 via the spring and accelerate the second and fourth carriers 20, 25 while the first and third carriers 18, 23 are being decelerated.

Figure 4:
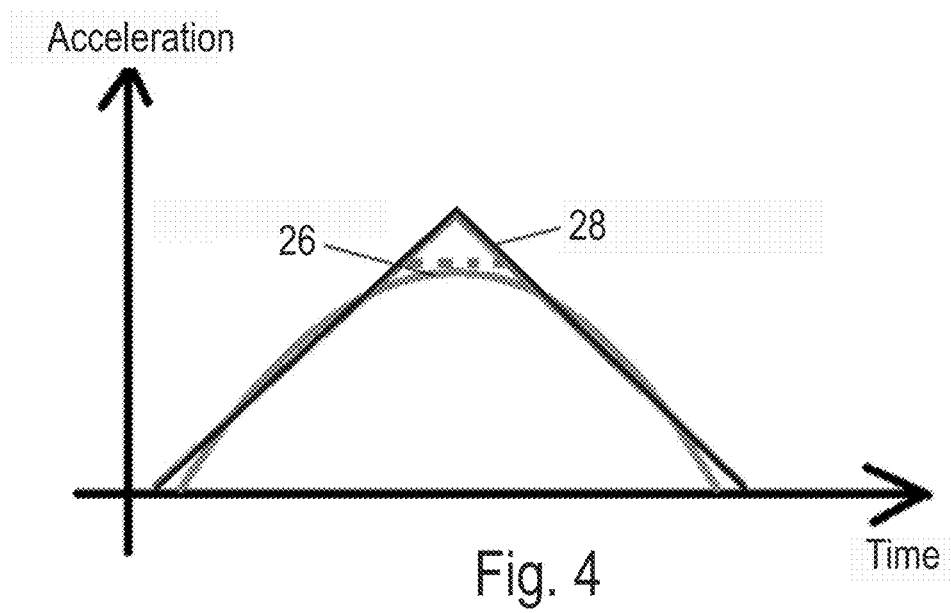
FIG. 4 an acceleration curve caused by the energy transmission element and an acceleration curve of a carrier caused by the control device.

FIG. 4 shows two acceleration curves of the second carrier, wherein the first acceleration curve 26 is attributable to an acceleration by the spring 22 (i.e. would occur if only the spring 22 were considered in the acceleration), while the second acceleration curve 28 is attributable to an acceleration by the control or control device 17 (i.e. would occur if only the acceleration caused by the electromagnets and controlled by the control device 17 were considered). The first acceleration curve 26, which is caused by the spring 22, has an approximately sinusoidal course and can, for example, be known, be determined by an iteration method by the control device 17, and/or be measured by means of sensors. The first acceleration curve 26 in particular depends on the properties of the spring 22 and on the speed and mass of the first and/or second carrier 18, 20. The second acceleration curve 28 corresponds to an acceleration acting on the second carrier 20 by the control device 17. As shown in FIG. 4, the second acceleration curve 28 has a triangular or trapezoidal course (indicated by a dashed line) to replicate and/or to approximate the sinusoidal acceleration course caused by the spring 22 as closely as possible. The second acceleration curve 28 or the acceleration produced on the second carrier 20 by the control device 17 is in particular adapted to the first acceleration curve 26. It is preferred that the acceleration curve 28 caused by the control deviates by at most 15 or 10% from the first acceleration curve 26 so that the control device 17 assists or at least does not reduce the acceleration of the second carrier 20 caused by the spring 22.

Figure 5:
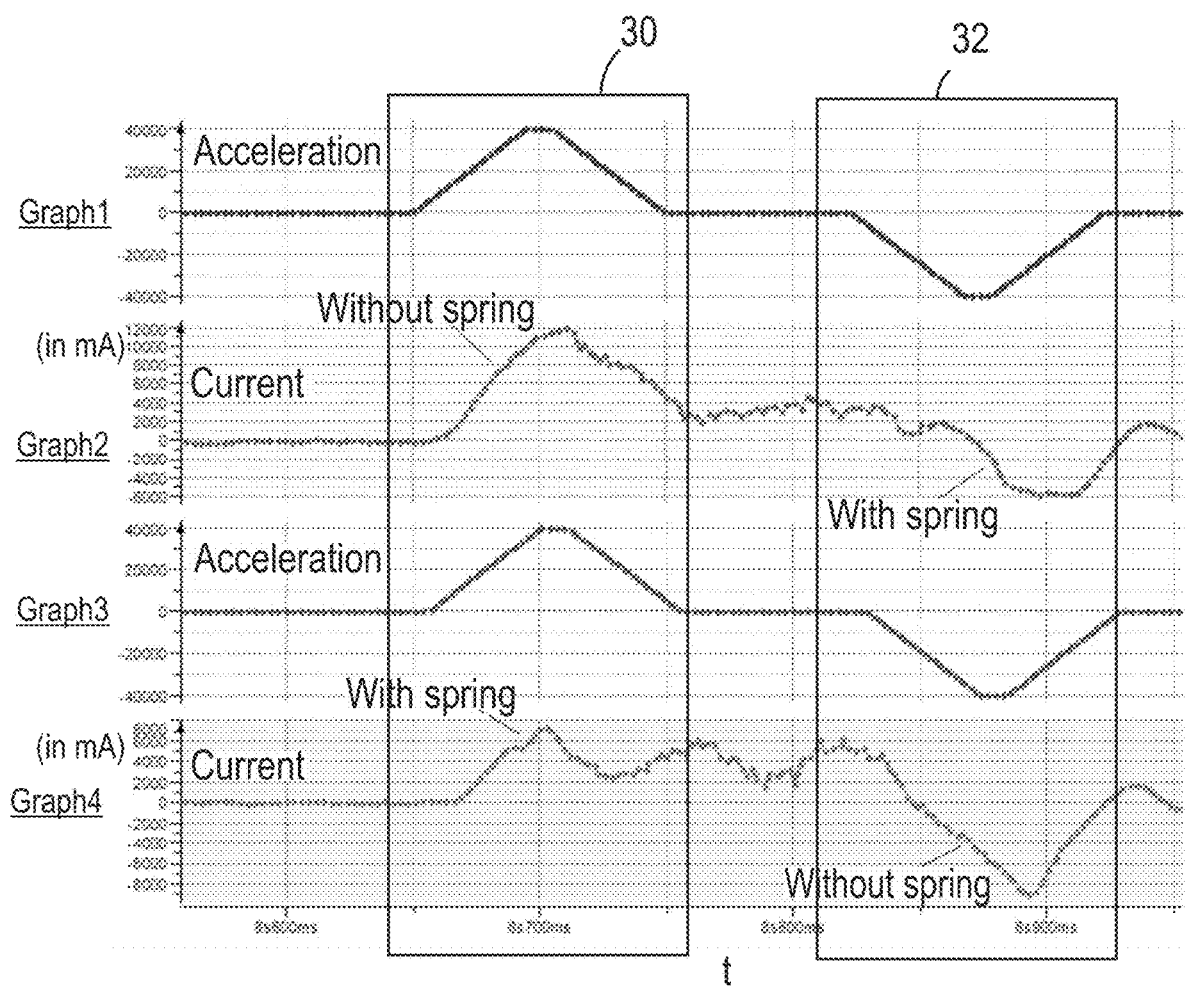
FIG. 5 acceleration courses of a carrier and corresponding current courses.

FIG. 5 shows an acceleration course of a carrier 14 and a current course corresponding to this acceleration course. The current course is in particular shown for an acceleration process 30 (left) of a carrier 14 and for a braking process 32 (right) of a carrier 14 with the use of a spring 22 as an energy transmission element and without the use of a spring 22. In this respect, it can be seen that the current course (graphs 2 and 4) of a carrier 14 is proportional to the acceleration course (graphs 1 and 3). It can also be seen that the required current for an acceleration process 30 of a carrier 14 with a spring 22 is less than in an acceleration process 30 without a spring 22. It is in particular shown in FIG. 5 that the maximum current value for an acceleration of a carrier 14 with a spring 22 is approximately 7 amperes (see acceleration process, graph 4) while the maximum current value for an acceleration without a spring 22 is 12 amperes (see acceleration process, graph 2). It can furthermore be seen that the required current is also smaller in the braking process 32 of the carrier 14 with a spring 22 than in the braking process 32 without a spring 22. In a braking process 32 of the carrier 14 with a spring 22, the magnitude of the maximum current value is approximately 6 amperes (see braking process, graph 2), while the magnitude of the maximum current value is 9 amperes in a braking process 32 of the carrier 14 without a spring 22 (see braking process, graph 4). Consequently, the current consumption of a linear motor system 10 comprising an energy transmission element such as a spring 22 is significantly lower than in the case of a linear motor system without a spring 22. Due to the lower current values, the demands on the system can further be reduced.

Figure 6A:
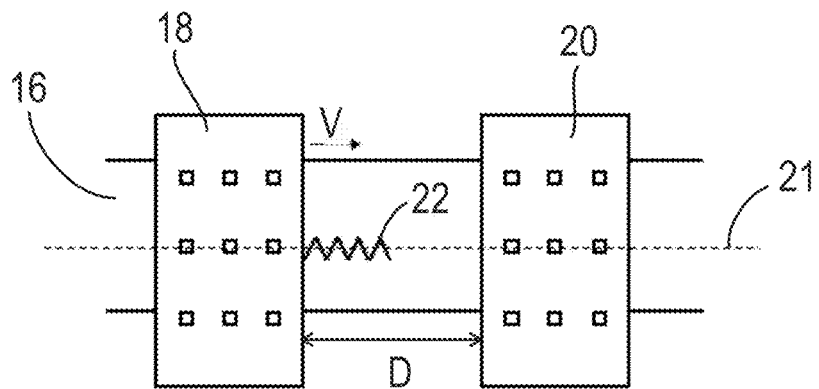
FIGS. 6A to 6C different embodiments with respect to the energy transmission elements.
Figure 6B:
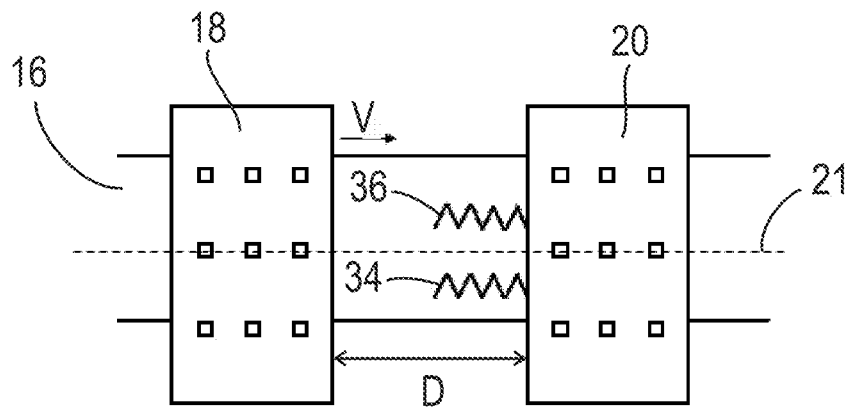
Figure 6C:
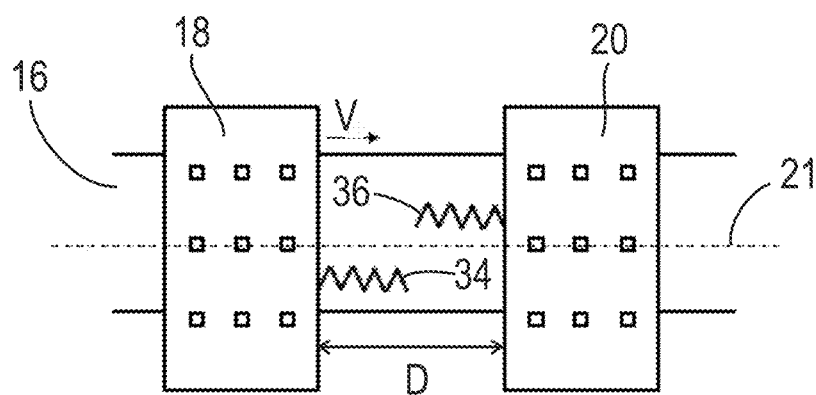

FIGS. 6A to 6C show different embodiments of the linear motor system 10. FIG. 6A shows a first carrier 18 and a second carrier 20 that are guided on a guide track 16, wherein the energy transmission element or the spring 22 is attached to the first carrier 18.

FIG. 6B shows an embodiment of the linear motor system 10 in which a first spring 34 and a second spring 36 are fastened to the second carrier 20, wherein the first spring 34 and the second spring 36 are arranged axially symmetrically to a center of mass line 21.

FIG. 6C shows an embodiment of the linear motor system 10 in which the first spring 34 is fastened to the first carrier 18 and the second spring 36 is fastened to the second carrier 20, wherein the springs 34, 36 are arranged such that they are axially symmetrical to the center of mass line 21 of the carriers 34, 36 during the contact with a carrier 34, 36.

REFERENCE NUMERAL LIST 10 linear motor system
12 linear motors
14 carrier
16 guide track
17 control device
18 first carrier
19 active region
20 second carrier
21 center of mass line
22 spring
23 third carrier
24 load
25 fourth carrier
26 first acceleration curve
28 second acceleration curve
30 acceleration process
32 braking process
34 first spring
36 second spring

The invention claimed is:

1. A linear motor system comprising:
a guide track having a plurality of electromagnets arranged distributed along the guide track;
a first and a second carrier that are guided by and movable along the guide track and that each comprise a drive magnet for cooperating with the electromagnets of the guide track to move the carriers;
a control device for controlling the movement of the carriers relative to the guide track by a corresponding control of the electromagnets; and
at least one energy transmission element that is fastened to the first and/or second carrier and that is configured to transmit energy from the first carrier to the second carrier,
wherein the control device is configured to adapt the control of the movement of the second carrier so as to assist or amplify an acceleration of the second carrier caused by the energy transmission element.

2. The linear motor system in accordance with claim 1, wherein the energy transmission element is configured to transmit the energy from the first carrier to the second carrier when the first and/or the second carrier enters/enter into an active region of the energy transmission element.

3. The linear motor system in accordance with claim 2, wherein the acceleration of the second carrier attributable to the control device is at least not negative in the active region and/or deviates by at most 15% or 10% from the acceleration attributable to the energy transmission element.

4. The linear motor system in accordance with claim 1, wherein the control device is configured to set the control of the movement of the second carrier such that an acceleration curve of the acceleration of the second carrier achieved by the control is an approximately triangular or trapezoidal acceleration curve.

5. The linear motor system in accordance with claim 3, wherein an optimal start spacing $d_{opt}$ between the second carrier and the first carrier is determined by means of an iteration method, wherein the iteration method comprises:
(1) a first start spacing di between the first carrier and the second carrier being defined, at which first start spacing di a first minimum distance $d_{min,1}$ between the carriers results that is smaller than an optimal minimum distance $d_{min,opt}$, wherein the start spacing defines a distance between the first carrier and the second carrier, with the first carrier starting to brake and the second carrier starting to accelerate on a falling below of said distance;

(2) a second start spacing $d_2$ between the first carrier and the second carrier being defined, at which second start spacing $d_2$ a second minimum distance $d_{min,2}$ results that is greater than an optimal minimum distance $d_{min,opt}$;

(3) a third start spacing $$d_3 = \frac{d1+d2}{2}$$

being calculated and a corresponding third minimum distance $d_{min,3}$ being determined;

(4) $d_1$ and $d_2$ being updated as follows:
$d_1 := d$ and
$d_2 := d_3$ if $(d_{min,1}-d_{min,opt})\cdot(d_{min,3}-d_{min,opt})<0$; or
$d_1 := d_3$ and
$d_2 := d_2$ if $(d_{min,2}-d_{min,opt})\cdot(d_{min,3}-d_{min,opt})<0$;

(5) steps (3) and (4) being repeated if $d_{min,2}-d_{min,opt}>$epsilon and $d_3$ is not equal to 0;

(6) the optimal start spacing $d_{opt}$ resulting as follows:
$d_{opt}=d_2$ or
$d_{opt}=d_3$ if $d_{min,3}-d_{min,opt}=0$.

6. The linear motor system in accordance with claim 1, wherein the energy transmission element comprises a spring.

7. The linear motor system in accordance with claim 6, wherein a spring constant $D_{spring}$ of the spring is represented by the equation:

$$D_{spring} = \frac{2E_{pot,spring}}{s_{deflection}^2},$$

where $D_{spring}$ represents the spring constant of the spring, $s_{deflection}$ represents the deflection distance of the spring at a maximum spring deflection, and $E_{pot,spring}$ represents the potential energy stored in the spring at a maximum spring deflection, wherein $E_{pot,spring}$ is determined as follows:

$$E_{pot,spring} = \frac{m}{4}v_{start}^2,$$

where m is the mass of a carrier and $v_{start}$ is the speed of the first carrier when contacting the spring.

8. The linear motor system in accordance with claim 7, wherein the deflection distance of the spring at a maximum spring deflection $s_{deflection}$ IS determined as follows:

$$s_{deflection} = s_{L1} - s_{L2} = \frac{3 \cdot v_{start}^2}{8 \cdot a} - \frac{v_{start}^2}{8 \cdot a} = \frac{v_{start}^2}{4 \cdot a},$$

where $s_{L1}$ represents a traveled braking distance of the first carrier, $S_{L2}$ represents a traveled acceleration distance of the second carrier, and a represents the magnitude of the acceleration of the first and/or second carrier.

9. A linear motor system in accordance with claim 1, wherein the energy transmission element can at least regionally be recessed in the carrier to which the energy transmission element is fastened.

10. A linear motor system in accordance with claim 1, wherein the energy transmission element is attached along a center of mass line that extends in the direction of travel through a center of mass of the first and/or second carrier.

11. The linear motor system in accordance with claim 1, wherein the linear motor system is a transport system.

12. The linear motor system in accordance with claim 11, wherein the transport system is a multi-carrier system.

13. A method of operating a linear motor system, wherein the linear motor system comprises:
a guide track having a plurality of electromagnets arranged distributed along the guide track;
a first and a second carrier that are guided by and movable along the guide track and that each comprise a drive magnet for cooperating with the electromagnets of the guide track to move the carriers; and
a control device for controlling the movement of the carriers relative to the guide track by a corresponding control of the electromagnets,
wherein the method comprises
transmitting, at least partly, energy of the first carrier to the second carrier by an energy transmission element fastened to the first and/or second carrier; and
adapting, via the control device, the control of the movement of the second carrier so as to assist or amplify an acceleration of the second carrier caused by the energy transmission element.

14. The method in accordance with claim 13, wherein the first carrier is decelerated on the transmission of the energy to the second carrier and the second carrier is accelerated on the transmission of the kinetic energy.

15. The method in accordance with claim 13, wherein a braking of the first carrier and an acceleration of the second carrier start when both carriers are located in the active region of the energy transmission element, and the braking of the first carrier and the acceleration of the second carrier end when both carriers have left the active region of the energy transmission element.

16. The method in accordance with claim 13, wherein the linear motor system is a transport system.

17. The method in accordance with claim 13, wherein the linear motor system further comprises:
the energy transmission element.

18. A carrier for a linear motor system, the linear motor system comprising:
a guide track having a plurality of electromagnets arranged distributed along the guide track;
a first and a second carrier that are guided by and movable along the guide track and that each comprise a drive magnet for cooperating with the electromagnets of the guide track to move the carriers;
a control device for controlling the movement of the carriers relative to the guide track by a corresponding control of the electromagnets; and
at least one energy transmission element that is fastened to the first and/or second carrier and that is configured to transmit energy from the first carrier to the second carrier, the control device being configured to adapt the control of the movement of the second carrier so as to assist or amplify an acceleration of the second carrier caused by the energy transmission element, the carrier comprising:
a drive magnet for cooperating with the plurality of electromagnets of the guide track of the linear motor system to move the carriers; and
at least one energy transmission element for transmitting kinetic energy.

\* \* \* \* \*